United States Patent [19]
Tinsley et al.

[11] 3,802,583
[45] Apr. 9, 1974

[54] SILO AND UNLOADER MEANS THEREFOR

[76] Inventors: Charles A. Tinsley; Alvin E. Tinsley; Galen C. Tinsley, all of Rt. 2, Canton, Kans. 67428

[22] Filed: July 31, 1972

[21] Appl. No.: 276,524

[52] U.S. Cl. .......................................... 214/17 DA
[51] Int. Cl. ............................................ B65g 65/46
[58] Field of Search ...................... 214/17 D, 17 DA

[56] References Cited
UNITED STATES PATENTS
3,648,896  3/1972  Baltz .......................... 214/17 DA X
3,403,795  10/1968  Schaefer ........................ 214/17 DA Primary Examiner—Robert G. Sheridan
Attorney, Agent, or Firm—John H. Widdowson

[57] ABSTRACT

An ensilage container has a rotatable floor therein. The floor has a passageway therethrough. Means mounted with the floor in operation moves ensilage material to the passageway. Apparatus below the floor in operation removes ensilage material from the container. The floor, means mounted therewith, and the apparatus mountable below the floor can be mounted in an existing silo.

7 Claims, 6 Drawing Figures

SILO AND UNLOADER MEANS THEREFOR

Numerous types of silos and silo unloading devices are known in the prior art as operable to remove silage or ensilage from the confines of a silo and deliver it to the exterior of the structure. Silo unloading devices come in two general types: one type unloads the silo from the top of the ensilage column, and the other type unloads the silo from the bottom of the column. In regard to the bottom unloading types of silos and silo unloaders, numerous types of devices are known in the prior art as being adapted to remove material from the bottom of a silo column; however, these prior art devices are usually very complicated structurally, difficult to regulate, and prone to become stuck in the silo due to the weight of the column above the device. Some of the prior art devices utilize a vertical auger or the like that is centrally disposed in the column of the silo and adapted to pull the silage downward through an aperture into some type of removal apparatus. This type of device wastes a great deal of silage in that the ensilage material forms into a funnel-like cone in the lower portion of the silo about the auger, and the device is provided with no means for removal of the excess material. Another prior art device for bottom unloading of a silo utilizes a rotatably mounted auger in the lower portion of a silo adapted to pull material to a passageway in the floor of a silo for removal. The auger of this type of silo unloader is uncovered and more or less free to move within the confines of the silo wall; it must operate under the weight of the silage above it. This type of removal device is often prone to become stuck due to the great weight of the silage above it. This device usually functions to dig out only a portion of the silage thereby forming a vacant space immediately above the auger, and requiring hand digging of the silage material to move into the path of the auger. The top unloading type of silo unloaders are constructed substantially different from the bottom unloading type with the main difference being that the former remove ensilage from the top of the column and move downward inside the silo with the level of the material.

In one preferred specifc embodiment, a silo and unloader means structure includes a cylindrical upright wall, a rotatably mounted silo floor with a passageway downward through the center portion thereof, an auger mounted on the upper portion of the floor to move silage into the passageway, and a conveyor apparatus under the rotatable floor to receive silage material from the passageway and remove it from the silo proper. The silo wall is preferably constructed in the upright cylindrical form being provided with means to fill the silo from its upper end and having the silo unloading apparatus of this invention on its lower portion. The floor is rotatably mounted within the confines of the silo; it is supported on a foundation and has a driving apparatus adapted to provide for rotation of the floor. The actual floor surface is curved and contoured much like an auger blade. The passageway has its inlet with the auger apparatus and the outlet thereof terminating above the conveyor apparatus. The auger portion of the silo unloader structure is mounted with the floor and extends from the passageway inlet to the outer peripheral portion of the floor. The auger is adapted to gather material in its path as it rotates with the floor under the silage column and move same material to the passageway. The auger is provided with a driving apparatus separate from the floor rotation driving apparatus. The conveyor apparatus is mounted with the receiving end portion thereof adjacent to the passageway outlet and the discharge end thereof on the exterior of the silo structure at a position convenient to the user of the silo. The conveyor extends through an opening in the silo wall and is adapted to provide a convenient means of removing silage from the silo after it has been carved out of the silage column by the floor and auger portions of the apparatus. The floor has a contoured upper surface constructed and adapted to cut silage directly from the bottom surface of the above silage column within the silo. The floor has a cutting edge portion and a ramp portion sloping downward therefrom with the cutting edge portion being above the auger. The floor is adapted to cut away portions of the silage or ensilage with the weight of the column of silage on the floor and simultaneously cause the column to continually move downward within the silo wall onto the floor during the cutting operation.

One object of this invention is to provide a silo structure overcoming the aforementioned disadvantages of the prior art devices.

Still, one other object of this invention is to provide a silo structure having a bottom unloader with a rotatable floor and auger adapted to cut silage from the bottom of the silage column within the silo and move same to a passageway through the floor for removal from the silo by a conveyor located below the floor and extending from the silo structure.

Still, another object of this invention is to provide a silo structure which is adapted to unload a silo from the bottom that has a rotatable floor constructed in a circular bladed configuration with a radially disposed auger apparatus at the cutting edge of the floor adapted to move silage material to the center portion of the floor for transfer through a passageway through the floor and removal from the silo structure.

Yet, another object of this invention is to provide a silo structure having a floor structure that supports the weight of the column of silage within the silo and is adapted upon rotation to cut silage from the bottom of the silage column and pass same through a passageway in the floor for removal from the silo by a conveyor apparatus.

Yet, another object of this invention is to provide a silo structure which is unloadable from the bottom and has an auger-like rotatable floor apparatus mounted in the lower portion of the silo above the bottom of the silo walls, having separate powering devices for rotation of the floor and operation of the auger apparatus and for a material removal conveyor.

Yet, an additional object of this invention is to provide a silo structure which has a bottom unloader apparatus with a rotatable floor structure at the bottom of the silo wall utilizing an auger apparatus to cut silage from the silage column within the silo, the unloader apparatus having separate and independent driving apparatuses for the rotation of the floor and rotation of the auger apparatus.

Various other objects, advantages, and features of the invention will become apparent to those skilled in the art from the following discussion, taken in conjunction with the accompanying drawings, in which.

Figure 1:
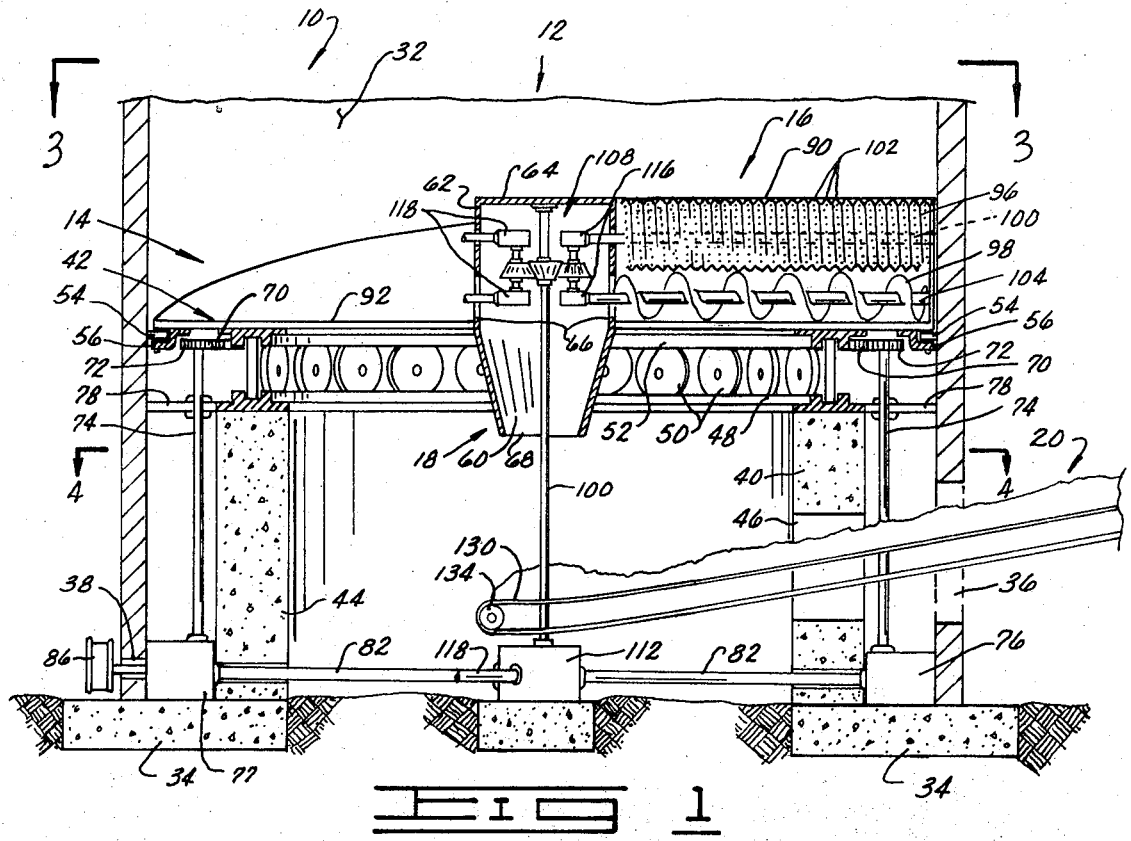
FIG. 1 is an elevation view of the lower portion of the silo in cross-section; the view through the central portion thereof is indicated by line 1—1 in FIG. 4.

The following is a discussion and description of preferred specific embodiments of the silo structure and silo unloader apparatus of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, that figure is a sectional view of a silo, indicated at 10, shown with the unloader apparatus therein and indicated generally at 12. The silo unloader apparatus 12 includes a rotatable blade-like contoured floor 14 mounted in the lower portion of the silo 10 having an auger apparatus 16 horizontally disposed and at a cutting edge portion of the floor 14. The unloader apparatus 12 additionally includes a discharge chute 18 connected with the discharge of the auger apparatus 16 which is positioned in the center portion of the floor 14. The unloader apparatus 12 has a removal conveyor apparatus generally indicated at 20 adapted to receive silage from the discharge chute 18 and remove it from the interior of the silo structure. The floor structure 14, auger apparatus 16 and conveyor 20 each have powering devices that enable each separate portion of the unloader apparatus 12 to function simultaneously or independently as desired.

Figure 4:
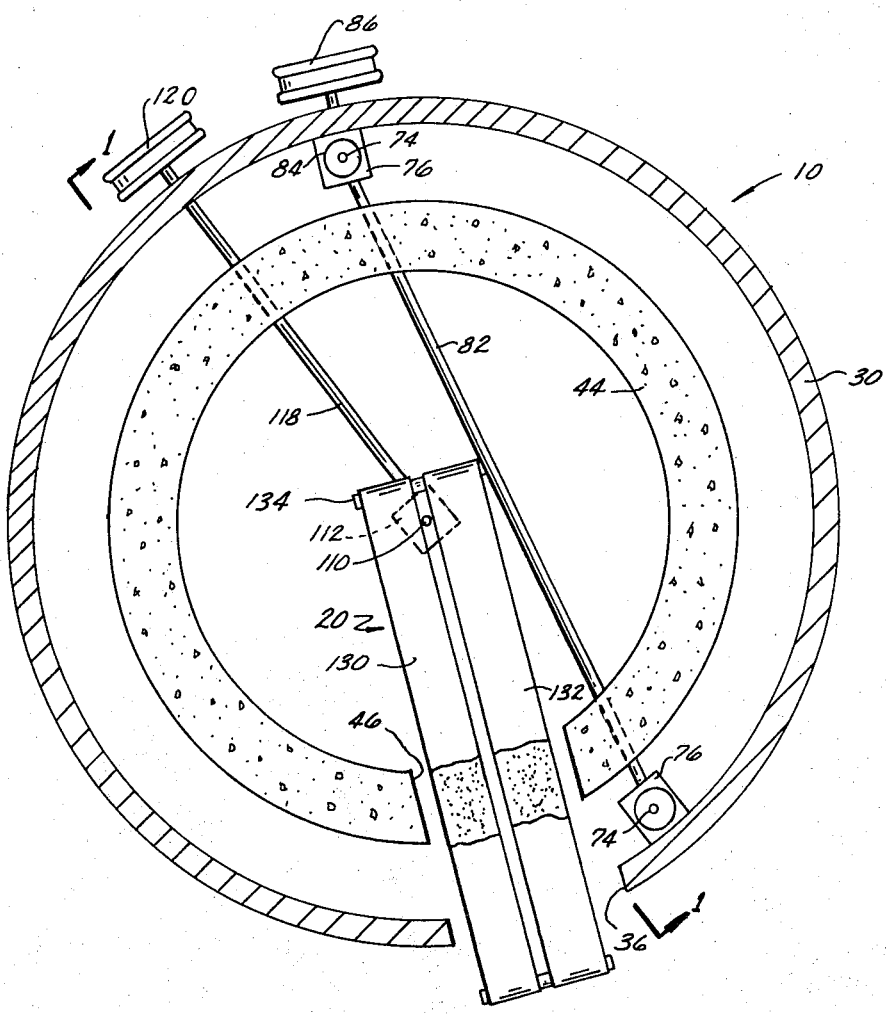
FIG. 4 is a cross-sectional view of the silo structure taken on line 4—4 in FIG. 1, showing the silo wall, the floor supporting foundation, the conveyor apparatus and portions of the drive apparatuses for the floor and auger.
Figure 5:
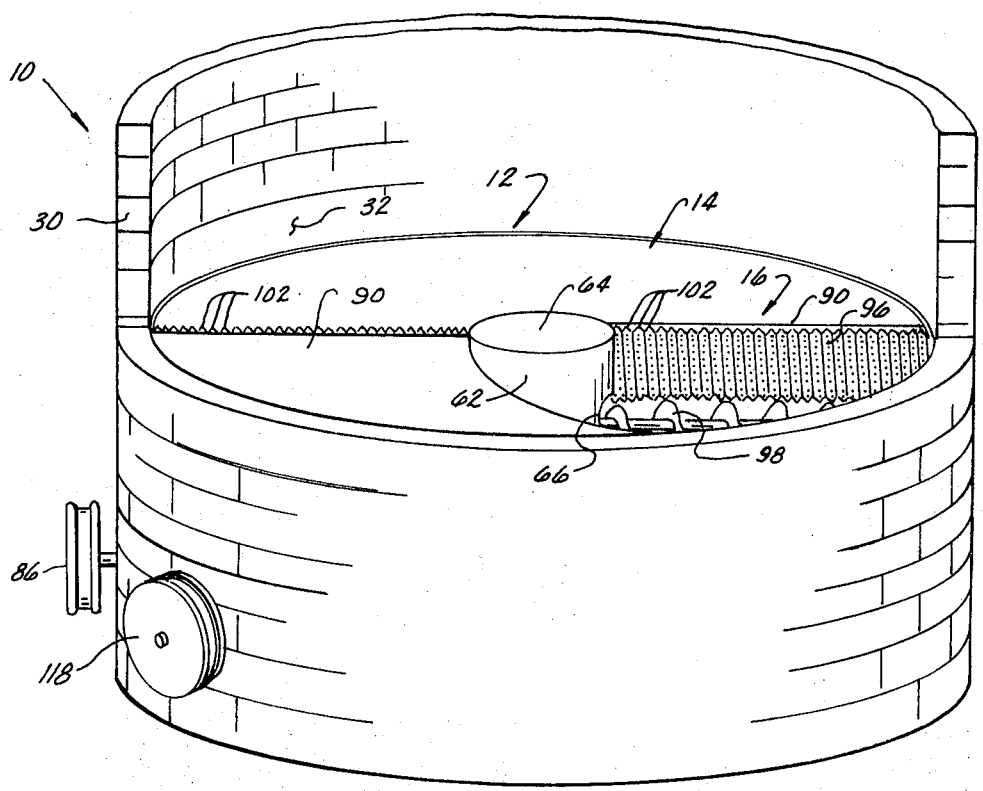
FIG. 5 is a perspective view of the silo structure taken from the exterior thereof and having portions of the wall removed exposing the floor, the auger apparatus, and inputs for the floor rotation and auger rotation apparatuses.

FIGS. 1, 4, and 5 clearly show the structure of the silo 10. The silo structure 10 includes a right cylindrical sidewall of the nature and style conventional with agricultural surroundings and structures. The silo sidewall 30 may be cylindrical or polygon shaped on its exterior but must necessarily have a smooth walled cylindrical portion in its lower portion adjacent to the rotatable floor 14 in order that the unloading apparatus 12 will function properly. Upper portions of the silo structure 10 above the unloader apparatus 12 may be cylindrical, polygon shaped or otherwise since such is not critical to operation of the unloader apparatus 12. The silo wall 30 preferably has a circular like foundation such as that indicated at 34 being sufficient to support the upper silo structure and extending inward a distance to form the foundation for the unloader apparatus floor structure as will be described hereinafter. An aperture 36 is provided through the silo wall 30 as shown in the right-hand side portion of FIG. 1, such being necessary for the removal conveyor 20 to operate and allowing sufficient space for material loaded on the conveyor to pass through the wall without being dislodged from the conveyor. Additional apertures in the silo wall 30 are provided for the driving apparatus as associated with the auger apparatus 16 and the rotatable floor 14; the aperture 38 on the left-hand side portion of FIG. 1 is provided for the powering device input of the rotatable floor apparatus 14; the aperture for the auger input is not visible in the drawings.

Figure 3:
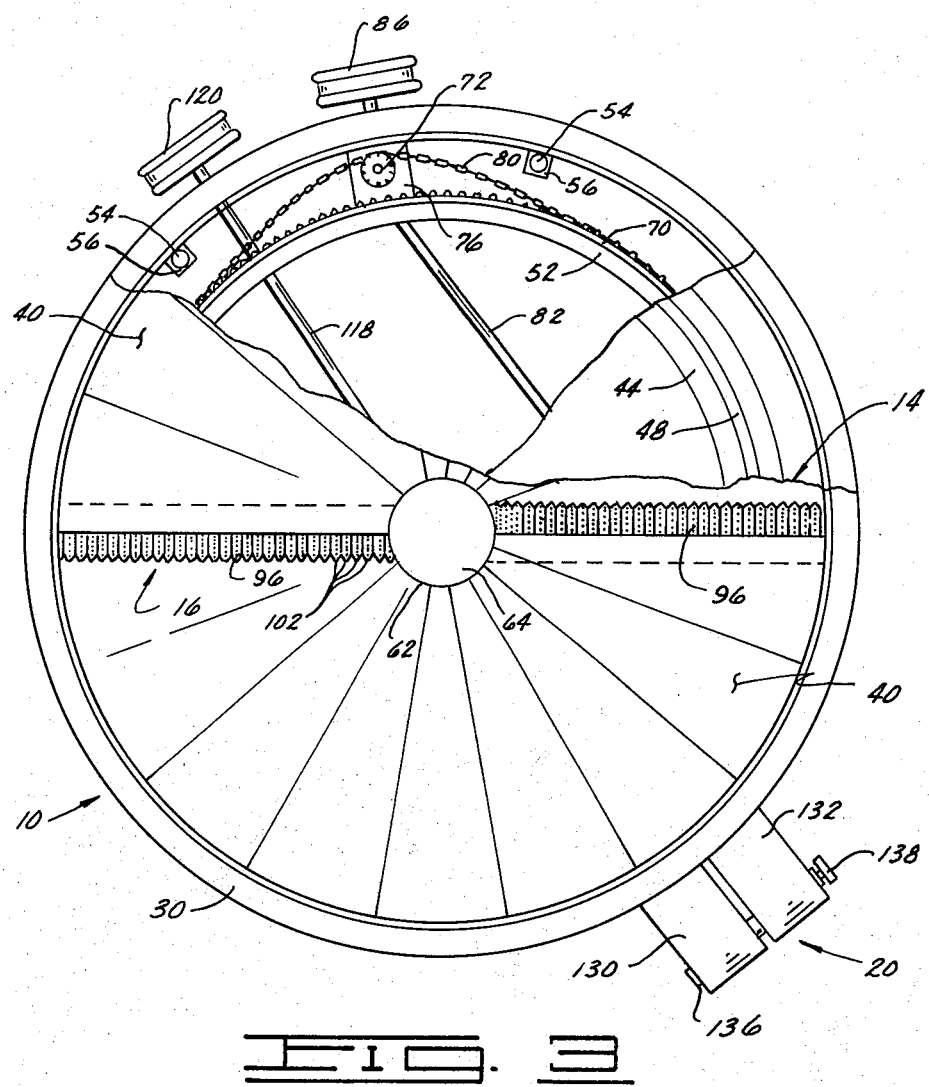
FIG. 3 is a top plan view of the silo structure having two cut away levels through the floor: one level is cut away to immediately below the floor surface and the augers showing a portion of the rotation drive apparatus, and centering rollers for the floor, the second level is cut away to below the support wheels of the floor and shows the floor foundation and the support wheel track.

FIGS. 1, 3, and 5 show the floor structure 14 in its relation with the silo structure 10. The floor structure 14 is generally circular, contains the auger apparatus 16 and is rotatably mounted within the silo wall 30 so as to rotate about its center. The floor structure 14 includes a contoured floor surface indicated at 40 with a supporting framework 42 therebelow having tracks and wheels to allow for rotation. The floor structure 14 has a foundation 44 which is circular and extends a distance above the silo foundation ground portions 34; it is provided with a passageway 46 for the removal conveyor apparatus 20 and other apertures for the floor and auger drive inputs. The foundation 44 is circular on its upper portion and has a circular track 48 thereon adapted to support and guide the plurality of wheels 50. An upper track 52 formed like the lower track 48 is secured to the floor frame structure 42. The lower track 48 and upper track 52 cooperate to hold the plurality of wheels 50 in place, this functioning somewhat like roller bearings in a race wherein the wheels 50 roll in the channeled tracks 48 and 52 in an adjacent relationship as the floor 14 rotates. The floor structure 14 has a plurality of guide rollers 54 on its peripheral portion adapted to roll on the sidewall interior 32 to help maintain the floor in its proper horizontal position. The guide rollers 54 are supported in fixtures 56 which are attached to the floor frame structure 42. The floor frame structure 42 includes a disk-like structure that can be in the form of a disk or a spoke-like structure adapted to support the floor surface on the upper track 52, support the auger apparatus 16, the guide wheels 54, and other components of the unloader apparatus.

The discharge chute 18 is a frusto-conical member 60 depending from the floor frame structure 42; it has an upper cylindrical portion 62 extending upward through the floor frame structure 42 and the floor surface 40 with a cap 64 on its upper end. The side of the cylindrical member 62 has openings to receive material from the auger apparatus 16 and to allow for driving mechanisms of the auger apparatus 16. The cylindrical member 62 as shown in FIG. 1 has apertures 66 on the lower portion thereof for the lower screw of the auger apparatus 16 so material can be passed from that screw into the discharge chute 18. The discharge chute 18 and attached cylindrical member 62 are positioned in the center of the floor structure 14 so the discharge chute outlet 68 will always be in the same general position as the floor 14 rotates.

The driving apparatus of the floor structure 14 consists of a large ring-like sprocket 70 attached to the upper wheel track 52 on its outer portion. A chain is wrapped around the sprocket 70 and connected with a pair of drive sprockets 72 on opposed sides of the silo 10. The drive sprockets 72 are connected to the powering device. The ring sprocket 70 is attached to the outer peripheral portion of the upper track 52, such sprocket being preferably constructed in short segments and attached to the track by a suitable means. Drive sprockets 72 are mounted on the ends of upright shafts 74 which extend from the gearboxes 76 and 77 shown mounted on the silo foundation 34. The upper ends of the drive shafts 74 are supported in mounts 78 for support and proper placement. A roller chain 80 passes around the ring sprocket 70 and the two drive sprockets 72 to facilitate rotation of the floor structure 14. The drive sprockets 72 are preferably placed relative to the rest of the structure in the positions generally shown in FIG. 1, such being spaced inward relative the peripheral portion of the floor 14 to allow for proper spacing of the guide roller fixtures 56, sprockets 72, and ring sprockets 70 so the floor structure will rotate without damaging interference or contact between the moving parts, specifically the roller chain 80 and the guide roller fixtures 56.

The gearboxes 76 and 77 are basically right angle drive units which are connected by a shaft 82 to rotate simultaneously. The gearboxes specifically indicated at 77 have a drive pulley 86 connected thereto on an extended shaft that passes through the silo wall 30 as can be clearly seen in FIG. 4. The drive pulley 86 provides a means to rotate the floor 14 by connecting the pulley 86 to some type of auxiliary powering device such as a tractor's power takeoff, electric motor, or any other auxiliary power unit with a rotational power takeoff. Both of the gearboxes 76 and 77 are constructed so as to rotate the shafts 74 at the same rate upon rotation of the drive pulley 86. It is to be noted that the gearbox 76 connected to the drive pulley 86 by the shaft 82 is on the opposite side of the silo structure 10 from the first drive gearbox and that the shaft 82 runs through the center portion of the silo structure yet not through the exact center. The off-center drive apparatus is necessary because of the mechanism needed to drive the auger apparatus 16.

Figure 2:
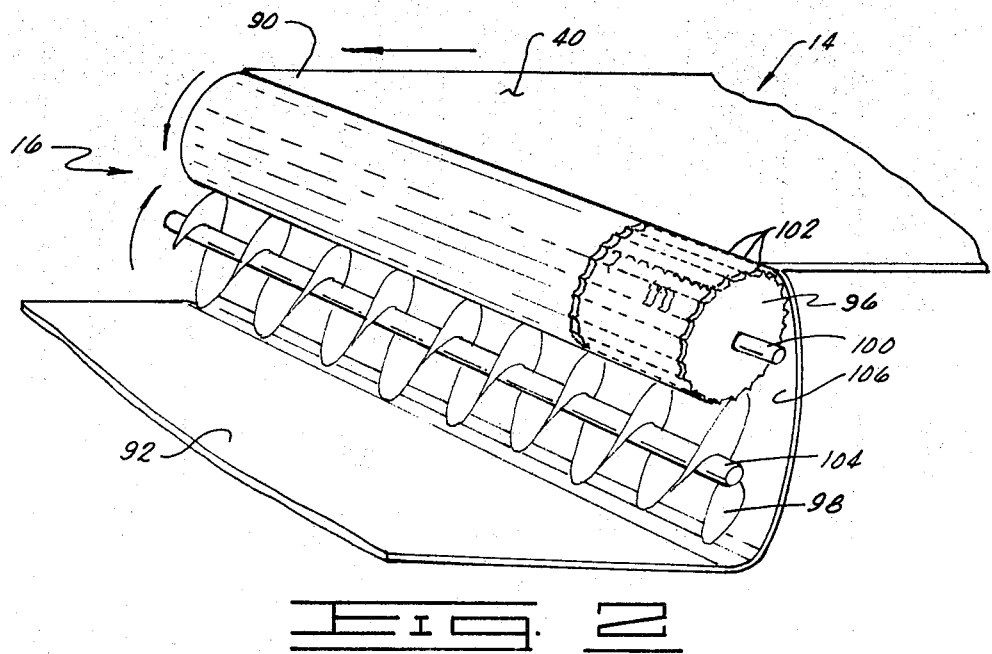
FIG. 2 is a perspective view of a portion of the floor upper surface and the auger apparatus including a fingered auger member above a screw type auger member.
Figure 6:
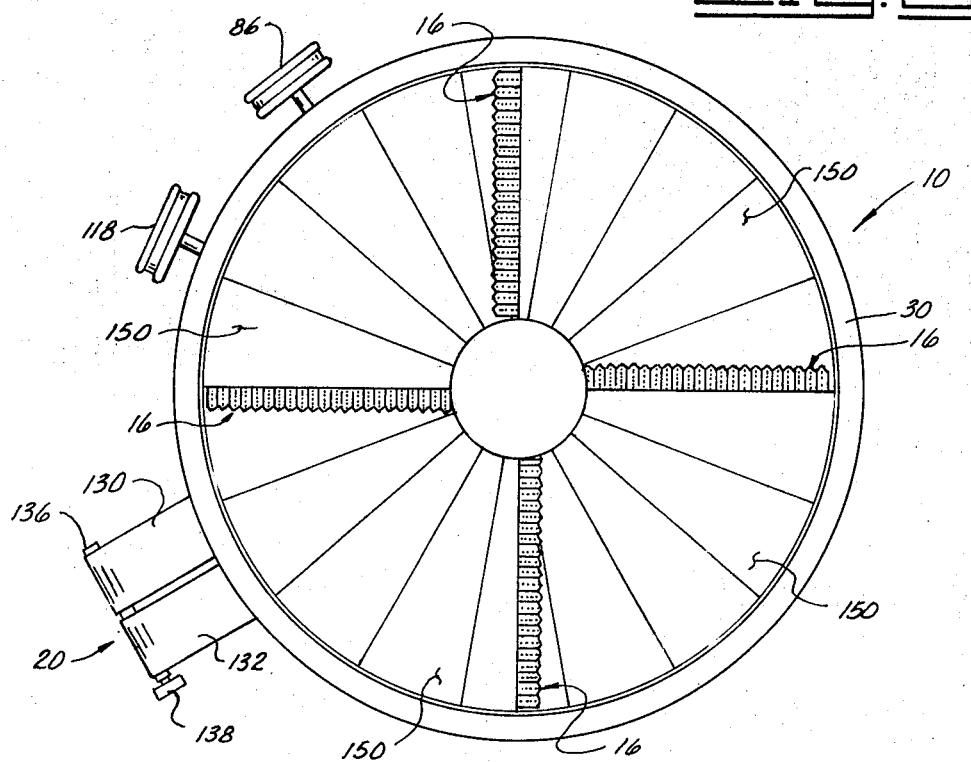
FIG. 6 is a top plan view of the silo structure having four radial augers and a floor structure with four segments.

The floor structure 14 has the floor surface 40 rigidly supported on its upper side and designed to withstand the weight of the column of silage pressing downward on it. FIGS. 1, 2 and 5 show the floor structure in detail. The shape of the floor surface 40 is an important feature of this invention, and is best described as generally resembling a screw type auger blade as seen by looking at the end of the shaft. The floor surface 40 has a horizontal portion 90 on what will be referred to as the cutting edge; this edge is adjacent to the upper roller of the auger apparatus 16. From the cutting edge 90 the floor slopes in a regular and smooth incline to a trailing edge 92 which is adjacent to the auger inlet as shown in the lower portion of FIG. 2. The unloader apparatus of this invention can be constructed with one or more apparatuses 16. In the case where it would be constructed with only one auger apparatus, the floor surface 40 would have but one segment with that segment having its cutting edge above the auger apparatus 16 as shown in FIG. 2 and the trailing edge of that segment joining with the lower portion of the auger apparatus also as shown in FIG. 2 generally below the cutting edge. In the case where the unloader apparatus 12 of this invention is constructed with more than one of the auger apparatuses 16, such as FIGS. 1, 3 and 5 where it is shown with two auger apparatuses, the floor surface 40 will have more than one segment with each segment having a cutting edge above an auger apparatus and a trailing edge 92 at the lower portion of the other auger apparatus. Where the unloader apparatus 12 is constructed with two auger devices 16, the floor surface segments are essentially semi-circular disk-like members connected between the respective portions of the two auger devices. The number of floor surface segments depends upon the number of auger devices in the unloading apparatus; for instance, with three auger devices the floor would have to have three floor surface segments; and with four auger devices the silo unloader apparatus would have to have four floor surface segments as shown in FIG. 6 of the drawings.

The amount of ensilage material cut from the ensilage column depends upon the floor construction of the unloader apparatus. For an unloader apparatus floor constructed with a single auger apparatus and a single floor segment, one complete turn would be required to cut material from the ensilage column in the height of the auger apparatus. For an unloader apparatus having two augers and floor segments, one-half a turn would be necessary to cut material in the height of the auger. Likewise, for an unloader apparatus with three augers and floor segments, only one-third of a turn would be necessary; and for an unloader with four augers and floor segments, only one-fourth of a turn would be necessary. A similar relationship follows for other multiples of the invention. The specific size of the auger apparatus determines the amount of material to be cut from a silage column for a particular unloader apparatus. The physical size of an auger apparatus and the number of such augers in an unloader apparatus depends upon consideration of the size of the silo, the material to be stored in it, how often it is to be filled and emptied and other considerations. The silo and silo unloader apparatus of this invention are of a nature that can be modified as described without departing from the scope of the invention.

The auger apparatus 16 preferably consists of a pair of rotatable members as shown in FIG. 1. The auger upper member is a cylindrical roller 96 having a plurality of fingers extending therefrom, and the lower auger member 98 is preferably a bladed screw type auger constructed and adapted to rotate and pull the silage material to the center of the floor structure 14 depositing same in the discharge chute 18. The upper auger member or fingered roller 96 is an elongated cylindrical member supported on a shaft 100 that is mounted with the floor frame structure 42, the cylinder having a plurality of fingers 102 extending therefrom. The lower auger member or screw conveyor 98 is preferably a conventionally styled bladed screw conveyor having the shaft 104 mounted with the floor frame structure 42. The screw conveyor 98 and fingered roller 96 are enclosed on one side by a shield 106 which provides a race for the screw conveyor blading, support for the floor structure 14, and affords some protection for the fingered roller 96 and screw auger 98 from the weight of the silage column. The fingered roller 96 is peferably placed as shown in FIG. 2 wherein its fingers 102 extend above the cutting edge 90 a short distance so as to enable the fingers to dig silage material from the column of silage and loosen it sufficiently for the screw conveyor 98 to move it.

Rotation of the fingered roller 96 and screw auger 98 is accomplished by a gear drive apparatus generally indicated at 108 in the center of the discharge chute 18. The gear mechanism 108 includes a vertical shaft 100 extending from a gearbox 112, gear drive devices indicated at 116 and 118 connecting the shaft 100 and the shafts of the upper and lower auger apparatus members 96 and 98 on opposing sides of the floor structure as shown in FIG. 1. The gearbox 112 is mounted in the center of the silo and connected by means of a shaft 118 to a drive pulley 120 on the exterior of the silo. The gearbox 112 is preferably a right angle type drive unit with the shaft 110 extending from it, the shaft being positioned in the center of the silo 10 and at the center of rotation for the floor structure 14. The auger drive devices 114 and 116 as shown in FIG. 1 are driven from a gear on the vertical shaft 110 and include other gears, etc., as necessary to operably connect the vertical shaft 110 and the rotatable portions of the auger apparatus 16. The specific geared structures of the auger drive 108 can be varied from that shown in the drawings without departing from the scope of the invention as such is shown to illustrate one means of operating the auger apparatus 16. Concerning the rotation of the auger apparatus members 96 and 98, the upper auger member or fingered roller 96 must rotate such that the fingers 102 move into the silage material as the floor rotates. The arrows in FIG. 2 indicate the direction of rotation of the floor structure 14 and of the fingered roller 96. The direction of rotation of the screw conveyor or lower auger member 98 depends upon the direction of the blading of that member; with the blading as shown in FIG. 2, the proper direction of rotation is indicated by the arrow adjacent to its left-handed end portion. Preferably the upper and lower auger members 96 and 98 rotate in the manner indicated by the arrows, thereby directly feeding material from the fingered roller 96 into the screw conveyor 98.

The conveyor 20 as shown in the drawings is preferably constructed with two conveyor belts 130 and 132 which run side by side and are positioned on opposite sides of the vertical auger drive shaft 110. FIG. 4 shows clearly the relationship of the dual conveyor belts 130 and 132. The innermost end of the conveyor belts 130 and 132 is supported on a single roller indicated at 134 and visible in FIG. 1. The outer end of the conveyor belts is supported on another single roller indicated at 136. The supporting apparatus for both ends of the conveyor 20 has been omitted from the drawings for clarity. The outer end roller 136 of the conveyor apparatus is provided with a pulley 138 which enables the conveyor apparatus to be driven from an auxiliary power unit in a similar manner to that used to drive the auger apparatus and the floor structure. Independently powering the conveyor 20 allows it to be operated independent of the auger and floor rotation functions of the unloader apparatus; this is necessary to remove the last of the silage from the silo when the unloading is stopped and to regulate the rate of silage removal relative to the rate it is cut from the silage column. The use of dual conveyor belts on opposite sides of the vertical shaft 110 allow for continuous deposit of material on the conveyor from the discharge chute 18 as the floor structure rotates.

FIG. 6 shows a top plan view of a silo structure with a silo unloader therein, the floor of which has four floor segments each indicated at 150, four individual auger apparatuses 16 and with the other components of the structures previously described. The silo structure with four floor segments has the portions thereof numbered similarly to corresponding portions of the previously described structures. The silo unloader apparatus with four floor segments is shown to illustrate in some detail the arrangement of a silo unloader apparatus having a plurality of floor segments and auger apparatuses greater than the two as shown in the other figures of the drawings. The arrangement physically of the four floor segments 150 is such that they ar quadrants of a circle. The silo unloader apparatus shown in FIG. 6 will operate in the same manner as the hereinbefore described silo unloader apparatus with the semi-circular floor segments. The multi-segment unloader apparatuses as the one shown in FIG. 6 are preferably used with silos having very large diameters thereby lessening the amount of material which one particular auger apparatus must remove.

In the use and operation of the silo 10 and silo unloader apparatus 12 of this invention, the silo is filled on its interior portions with silage material, grains, or whatever in the usual manner from its top or someplace on its upper portion. Before the silo is filled with material, provided that it is empty completely before the filling, the auger apparatuses 16 are preferably covered with a sheet of heavy gauge water resistant paper material so as to prevent them from being packed full of material as the silo is being filled. As the silo is being filled, the material falls to the bottom of the silo 10 and onto the floor surface 40 whereupon it builds up within the silo sidewall 30. The entire vertical weight of the silage material filling the silo is carried on the floor structure 14 with some of the weight force supported by the silo wall 30. In order to remove the silage material from the silo 10, the floor rotation mechanism, the auger rotation mechanism and the conveyor mechanism must each be connected to auxiliary powering units. The drive pulley 86 is connected to an auxiliary power unit to provide rotation of the silo floor structure 14. The drive pulley 120 is connected to an auxiliary power unit to provide rotation of the auger apparatus 16. The conveyor apparatus 20 is connected by means of the drive pulley 138 to an auxiliary power unit to provide for its operation. In beginning operation of the unloader apparatus all three auxiliary power units are set into motion causing operational rotation of the floor structure, rotation of the auger apparatus 16 and motion of the conveyor 20. Initially, the heavy gauge paper material placed over the upper and lower auger members 96 and 98 is pulled into them by their normal motion and discharged from the conveyor; this uncovers the augers allowing them to move into the silage material digging it from the bottom of the silage column. The rate at which the floor structure 14 can be rotated and the auger apparatus 16 can be rotated is the function of the density and type of material stored in the silo; for this reason the separate apparatuses are provided with independent powering devices to enable the user to regulate the speed at which each moves. As the floor 14 rotates, it moves the auger apparatus into the silage material and allows other silage material to move downward within the interior silo wall 32 on the floor surface 40. The slope of the floor surface 40 feeds silage material directly into the path of the auger apparatus 16 as the floor rotates. No means is necessary to dislodge silage material from above the unloader apparatus due to the weight of the material itself which has a tendency to move downward and compact on its lower portions. As silage material is cut out by the fingered roller 96, the cutting edge 90 separates material to be removed from the material to be left on top of the floor surface 40. The material which is dislodged passes downward into the screw auger 98 ans is moved to the discharge chute 18 whereupon it falls through the discharge chute passing from the outlet 62 onto the conveyor belts 130 and 132 for removal from the silo. When material is on the conveyor 20, it is moved to an area outside of the silo convenient for the user to haul it away. When it is desired to cease operation of the unloader apparatus 12, the independently powered portions of the apparatus enable the user to stop rotation of the floor 14 and continue operation of the auger apparatus 16 and the conveyor 20 to remove the remaining dislodged silage material. Removal of dislodged and remaining silage material from the auger apparatus 16 may be necessary once rotation of the floor 14 has been stopped, depending upon the density and tendency of a particular material to compact and jam or stick in the auger apparatus when it is stopped. In the event it is necessary, it is easily accomplished by operating the auger 16 and conveyor 20 until all the dislodged material has been removed. In some cases, depending upon the particular ensilage material and the amount of it in the silo, it may not be necessary to clean out the dislodged material before stopping the operation.

In the manufacture of the silo structure of this invention, it is obvious the structure can be constructed along with building of a silo structure or if necessary such can be added to an existing silo structure to achieve the end product. The unloader apparatus of this invention can be constructed separately from the actual silo 10 at a manufacturing plant or cite remote from the place where it is to be used and installed in the silo at a farm or the like. The actual machinery of the unloader apparatus can be constructed in the same manner and with the same methods and materials currently used in the production of farm machinery and with no more difficulty than other prior art silo unloader structures.

In the use and operation of the silo and unloader means therefor of this invention, it is seen that same provides a silo unloader structure which is adapted to remove silage material from the bottom of a silo in a continuous operation which will allow the removal of all the material from a silo structure without necessitating any substantial hand removing of the material. The silo unloader apparatus 12 is operated by means of three independent and auxiliary power units to rotate the floor, rotate the auger apparatus, and move the conveyor, all of which cooperate to remove material from the silo. The rotation of the floor and the augers in effect cuts material from the bottom of the ensilage column in the silo.

As will become apparent from the foregoing description of the applicant's silo and unloader means therefor, relatively simple means have been provided to remove silage material from a silo. The silo structure is simple to use, basically simple in its operation, and provides means of removing substantially all the silage material from a silo by removing it from the bottom of the silage column. The silo and silo unloader structure is economical to use in that it does not require a person to hand dig any portion of the silage material from the silo, lessening the danger to workmen and eliminating a labor cost.

While the invention has been described in conjunction with preferred specific embodiments thereof, it will be understood that this description is intended to illustrate and not limit the scope of the invention, which is defined by the following claims.

We claim:

1. Ensilage storing means, comprising:
   a. an upright container,
   b. a rotatable floor means in the lower portion of said container, said floor means having a passageway therethrough providing communication between the container above said floor means and beneath said floor means, and
   c. means mounted with said floor means constructed and adapted in operation to move ensilage material on said floor means into said passageway to pass therethrough to a point beneath said floor means, a conveying means mounted beneath said floor means and constructed and adapted to in operation move ensilage material from beneath said floor means to a point outside said container, said upright container is a silo, said silo has an ensilage storage space above said floor means, said passageway through said floor means is in the center portion of said silo, said means to move ensilage is an auger means, and said floor means has a cutting edge portion adjacent the upper portion of said auger means in said ensilage storage space, a trailing edge portion adjacent the lower portion of said auger means, and a contour portion connecting said cutting edge portion and said trailing edge portion.

2. Unloading means mountable within a silo, comprising
   a. rotatable floor means having a passageway therethrough providing communication between an ensilage storage space above said floor means and a point beneath said floor means, and
   b. means mounted with said floor means constructed and adapted in operation to move ensilage material on said floor means to said passageway to pass therethrough to a point beneath said floor means, a conveying means mounted beneath said floor means and constructed and adapted in operation to move ensilage material from beneath said floor means to a point outside said container, said means to move ensilage is an auger means, said passageway is in the center portion of said floor means, said unloading means in operation is constructed and adapted upon rotation of said floor means and upon operation of said auger means to move ensilage material to said center portion of said floor means for passing through said passageway to said conveying means, and said floor means has a cutting edge portion adjacent the upper portion of said auger means, a trailing edge portion adjacent the lower portion of said auger means, and a contour portion connecting said cutting edge portion and said trailing edge portion.

3. The unloader means of claim 2, wherein:
said floor means has a powering means constructed and adapted in operation to rotate said floor means with said cutting edge portion moving into ensilage material in said ensilage storage space.

4. The unloader means of claim 3, wherein:

a. said auger means has an upper member constructed and adapted in operation to loosen ensilage material from said storage space, and b. said auger means has a lower member constructed and adapted in operation to move loosened ensilage material to said passageway.

5. The unloader means of claim 4, wherein:

a. said floor surface is circular in planform, and b. said floor surface slopes from said cutting edge portion to said trailing edge portion.

6. The storing means of claim 1, wherein:

said silo has a wall below said floor means with an aperture therethrough constructed and adapted in operation to have said conveying means extending therethrough.

7. The storing means of claim 6, wherein:

said storing means has a powering means constructed and adapted in operation to rotate said floor means wherein said cutting edge portion moves through said ensilage storage space in a cutting motion, and said storing means has a powering means constructed and adapted in operation to rotate said auger means to loosen ensilage material from said storage area and move same said loosened material to said passageway.

* * * * *